United States Patent Office 3,013,046
Patented Dec. 12, 1961

3,013,046
METHOD FOR PREPARING A GASOLINE ADDITIVE CONTAINING BORON AND PHOSPHORUS
Marlene Denny, Shaker Heights, and Chien-wei Liao, Beachwood, Ohio, assignors to The Standard Oil Company, Cleveland, Ohio, a corporation of Ohio
No Drawing. Filed Mar. 10, 1960, Ser. No. 13,979
4 Claims. (Cl. 260—461)

This invention pertains to a method for preparing novel compounds containing both boron and phosphorus in the molecule.

The compounds prepared by the method of the present invention have the following general formula:

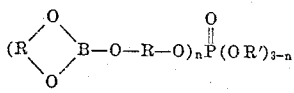

where R is an alkylene group, preferably an alpha or beta alkylene group, containing from 4 to 12 carbon atoms, R' is an alkyl, aryl, alkaryl, or arylalkyl group containing up to about 12 carbon atoms, and $n$ is a small whole number of from 1 to 3.

These compounds find utility as gasoline additives. The virtues of gasoline compositions containing these compounds are set forth in co-pending application Serial No. 13,978, filed March 10, 1960, assigned to our assignee. The disclosure of the latter co-pending application is incorporated herein by reference to the extent as may be required for a clear and complete understanding of the performance benefits which may be derived by incorporating these compounds into gasoline compositions.

The method of the present invention for preparing the above-described boron-phosphorus compounds involves essentially a two-step process. The first step consists of forming a mono-alkali metal salt by reacting an alkali metal caustic with a diglycol borate having the following general formula:

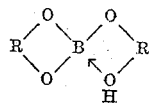

in which R is an alkylene group, preferably an alpha or beta alkylene group, containing from 4 to 12 carbon atoms. The above general formula for diglycol borates is intended to include compounds in which the alkylene radical may be different for the two positions shown for R; for example, where one R is hexylene and the other R is butylene.

The second step of the process of the present invention consists of reacting the diglycol borate salt formed in step one with a phosphorus source of the following general formula:

where X and Y may be chlorine or the radical OR' in which R' is an alkyl, alkaryl, or arylalkyl group containing up to 12 carbon atoms to form a reaction mixture containing the desired boron-phosphorus compound and an alkali metal salt. Accordingly, when X and Y are both chlorine, the phosphorus source, for example, will react with a mono-sodium salt of a diglycol borate as follows:

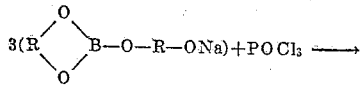

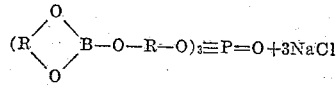

when X or Y is OR' and the other is Cl, the corresponding reaction goes as follows:

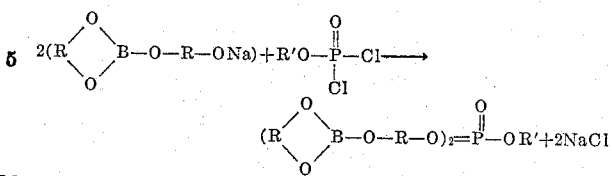

and when X and Y are both OR', the corresponding reaction goes as follows:

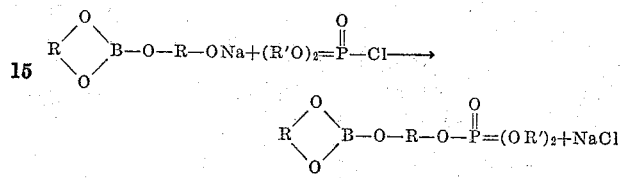

In preparing the diglycol borate salt, the diglycol borate is dissolved in a solvent and reacted with an alkali metal source at elevated temperatures. The source may be the pure alkali metal introduced in small pieces or in the form of a fine dispersion, but preferably the reaction is conducted with the hydroxide of the alkali metal under conditions so that the water of reaction that forms is removed. The alkali metal hydroxide is preferably added as an aqueous solution but may be employed in the reaction if desired in pellet form. The water of reaction, as well as any water introduced with the reactants, may be removed by air blowing or simple boiling, but it is preferred to accomplish this by azeotropic distillation. The reaction temperature of the process is preferably held below 100° C. since diglycol borates have a tendency to decompose above this temperature. Accordingly, when the water of reaction is removed by azeotropic distillation in accordance with the most preferred embodiment of the process, it is desirable to select a solvent which azeotropes with water below 100° C. Illustrative examples of suitable solvents for this step of the reaction are benzene, toluene, xylene, cyclohexane, normal pentane, normal hexane, normal heptane, and naphtha blends boiling in the range of from 80 to 100° C.

In executing the second step of the process, the diglycol borate salt is reacted with the proper amount of phosphorus oxytrichloride or an alkyl chlorophosphate in the presence of an added solvent at the refluxing temperature. The reaction mixture obtained thereby consists essentially of the desired product and an alkali metal salt. The product may be separated from the salt by any suitable means. One convenient means is to filter the reaction mixture, such as on a rotary filter, whereby the salt is held back and the product is collected as the filtrate. If desired, the product may be further refined by solvent extraction to remove any remaining insoluble substances.

It has been found to be quite important to control the temperature of reaction in this step of the process because at higher temperatures the product tends to polymerize and is not satisfactorily soluble in gasoline for use as an additive. Accordingly, it is desired that this reaction temperature be maintained under about 45° C. The solvent selected for the reaction, therefore, should have a refluxing temperature below 45° C. and may be either an aromatic or non-aromatic material or mixtures of the same.

The reaction time for this step of the process will vary with the choice of solvent and the specific boron-phosphorus compound from the desired class that it is desired to prepare. It has been found that reaction time may be substantially reduced by the use of small amounts of catalyst such as pyridine or tertiary amines or mixtures of these materials with lower aliphatic alcohols.

3

The following examples illustrate the best mode contemplated for carrying out the method of the present invention but are not intended to limit the invention in any way.

Example I 563.4 grams (3 moles) of di-(butanediol-1,3) borate was dissolved in 3000 milliliters (ml.) of benzene present in a 5-liter, 3-necked flask. To this solution a solution of 117.4 grams (2.85 moles) of sodium hydroxide in 138 ml. of water was added slowly and the mixture heated at the azeotrope temperature until the theoretical amount of water of reaction as well as that water introduced with the hydroxide reactant was removed.

The reaction product, a white salt, was removed from the flask, filtered, and dried in an oven overnight at approximately 100° C. The yield of product was 90% of theoretical. 550 grams (2.63 moles) of the mono-sodium salt was then placed in a flask with 2 liters of a solvent mixture comprising 20% by volume benzene and 80% by volume pentane. To this solution 449 grams (2.6 moles) of diethyl chlorophosphate was slowly added by means of a dropping funnel over a period of 10 minutes. The reaction mixture was then heated to the reflux temperature of 40° C. with stirring. After the reaction had continued for 2½ hours, 10 ml. of pyridine was added to the reaction mixture. A small amount of reaction mixture was withdrawn periodically, filtered, and the filtrate tested for chloride ion. After 16 hours of reaction under the above-described conditions, the chloride ion test was negative and the reaction was considered completed. The yield of final product was 97% of theoretical. The product analysis is found below.

|  | Theoretical | Found |
| --- | --- | --- |
| Molecular Weight | 323.8 | 324.5 |
| Percent by wt. Phosphorus | 9.60 | 8.69 |
| Percent by wt. Boron | 3.36 | 3.20 |

The product was completely soluble in gasoline and has the following formula:

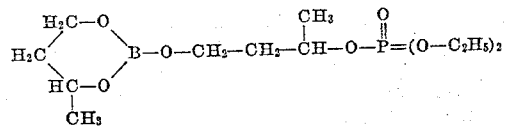

Example II 21.6 grams (0.1 mole) of di-(pentanediol-2,4) borate was dissolved in 500 ml. of toluene and placed in a 1-liter, 3-necked flask. 2.3 grams (0.1 mole) of sodium was added in small pieces to the refluxing borate solution. After refluxing for 14 hours, all the sodium disappeared and the evolution of hydrogen ceased. The yield of mono-sodium salt from the reaction was 83% of theoretical.

6 grams (0.025 mole) of the salt was then removed and placed in a flask with 200 cc. of a solvent mixture of 20% by volume benzene and 80% by volume normal pentane. To this mixture 4.31 grams (0.025 mole) of diethyl chlorophosphate was slowly added and the reaction mixture was then heated to the reflux temperature of 40° C. 1 ml. of pyridine was added and the reaction continued for 10 hours, after which a negative chloride ion test was obtained for a small aliquot sample of the reaction mixture. The reaction mixture was then removed from the flask and filtered. The filtrate was stripped to remove the final traces of solvent from the product. The yield of final product was 94% and had the following formula:

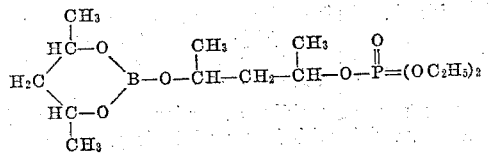

Example III 563.4 grams (3 moles) of di-(butanediol-1,3) borate was mixed in a 5-liter, 3-necked flask with 3000 ml. of benzene. To this solution a solution of 117.4 grams (2.85 moles) of sodium hydroxide dissolved in 138 ml. of water was added slowly over a period of 1 hour. The reaction mixture was heated to the azeotrope distillation temperature and the water of reaction was removed from the mixture over a period of 21 hours.

The reaction product, a white salt, was then removed from the flask, filtered, and dried in an oven overnight at approximately 100° C. The yield of mono-sodium salt was 98% of theoretical. 41.9 grams of this salt (0.2 mole) was placed in a 500 ml., 3-necked flask together with 200 ml. of a solvent mixture of 20% by volume benzene and 80% by volume normal pentane. To this solution 14.9 grams of methyl dichlorophosphate (0.1 mole) was slowly added by means of a dropping funnel over a period of 5 minutes. The reaction mixture was then heated to the refluxing temperature of 40° C. Periodically a small sample of the reaction mixture was withdrawn, filtered, and subjected to the chloride ion test. After 9 hours, the chloride ion test indicated that the reaction was complete. The product was then removed from the flask and filtered to remove the sodium chloride formed during the reaction. The filtrate was stripped to remove the final traces of solvent. The resulting product was 90% soluble in a solvent mixture of 20% benzene and 80% pentane and had the following formula:

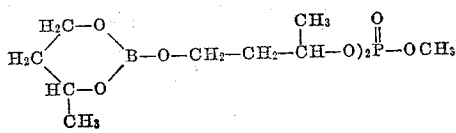

Example IV 62.7 grams of the mono-sodium salt of di-(butanediol-1,3) borate prepared in accordance with the first step of Example III was stirred with 300 cc. of a solvent mixture of 20% by volume benzene and 80% by volume normal pentane in a 500 cc., 3-necked flask. 15.3 grams of phosphorus oxytrichloride was added to this solution and the reaction mixture was heated at the refluxing temperature for a period of 15 hours. At the end of this period, the reaction mixture was removed from the flask, filtered, and the filtrate was stripped to remove the final traces of solvent. The yield of final product was 78.5%. 91% of the product was soluble in solvent mixture of 20% benzene and 80% normal pentane and has the following formula:

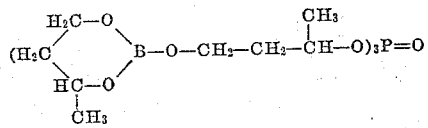

It is to be understood that various modifications of the foregoing invention will occur to those skilled in the art upon reading the above description. All such modifications are intended to be included as may be reasonably covered by the appended claims.

We claim:
1. A method for preparing compounds of the following general formula:

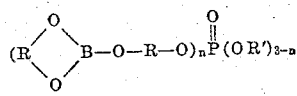

wherein R is an alkylene group containing from 4 to 12 carbon atoms, R' is a hydrocarbon radical selected from the group consisting of alkyl, aryl, alkaryl, and arylalkyl groups containing up to 12 carbon atoms, and where $n$ is a small whole number of from 1 to 3, consisting of the steps of (1) forming a mono-alkali metal salt of a diglycol borate compound of the general formula:

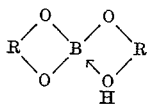

in which R is defined as above, by reacting said diglycol borate compound with an alkali metal source selected from the group consisting of an alkali metal in finely divided form and an alkali metal hydroxide in the presence of a solvent at a temperature under about 100° C. and removing any water of reaction that is formed, and (2) reacting said diglycol borate salt of step (1) with a phosphorus source of the general formula:

where X and Y is selected from the group consisting of chlorine and the radical OR' in which R' is defined as above, in the presence of a solvent at refluxing temperature, said solvent having a boiling point under about 45° C., and removing the alkali metal salt that is formed.

2. A method for preparing compounds of the following general formula:

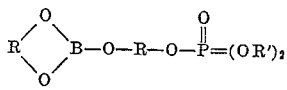

wherein R is an alkylene group containing from 4 to 12 carbon atoms, R' is an alkyl group containing up to 12 carbon atoms, consisting of the steps of (1) forming a mono-alkali metal salt of a diglycol borate compound of the general formula:

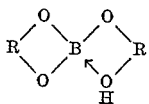

in which R is defined as above, by reacting said diglycol borate compound dissolved in a solvent which azeotropes with water under about 100° C. with an alkali metal hydroxide at the azeotropic distillation temperature to remove water from the reaction mixture, and (2) reacting said diglycol borate salt of step (1) with a phosphorus source of the general formula:

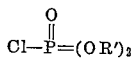

in which R' is defined as above, in the presence of a solvent at refluxing temperature, said solvent having a boiling point under about 45° C., and removing the alkali metal salt that is formed.

3. A method for preparing the compound of the following formula:

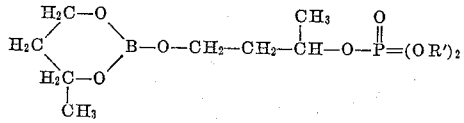

wherein R' is an alkyl group containing up to 12 carbon atoms, consisting of the steps of (1) forming a mono-sodium salt of di-(butanediol-1,3) borate by reacting said di-(butanediol-1,3) borate dissolved in a solvent which azeotropes with water under about 100° C. with an aqueous solution of sodium hydroxide at the azeotropic distillation temperature to remove the water from the reaction mixture, and (2) reacting said mono-sodium salt of step (1) with a phosphorus source of the general formula:

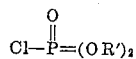

in which R' is defined as above, in the presence of a solvent at refluxing temperature, said solvent having a boiling point under about 45° C., and removing the sodium chloride that is formed.

4. A method for preparing the compound of the following formula:

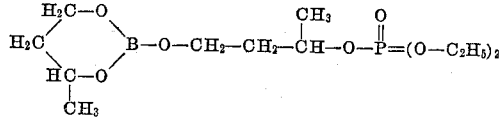

consisting of the steps of (1) reacting di-(butanediol-1,3) borate dissolved in benzene with an aqueous solution of sodium hydroxide at the azeotropic distillation temperature to remove the water from the reaction mixture, and (2) reacting the product of step (1) with diethyl chlorophosphate in the presence of a solvent mixture consisting of 20% by volume benzene and 80% by volume pentane at the refluxing temperature, and removing the sodium chloride that is formed.

No references cited.